Dec. 5, 1967   G. E. KRUEGER ET AL   3,355,805
CHEESE MANUFACTURING APPARATUS
Filed Jan. 12, 1966   3 Sheets-Sheet 1
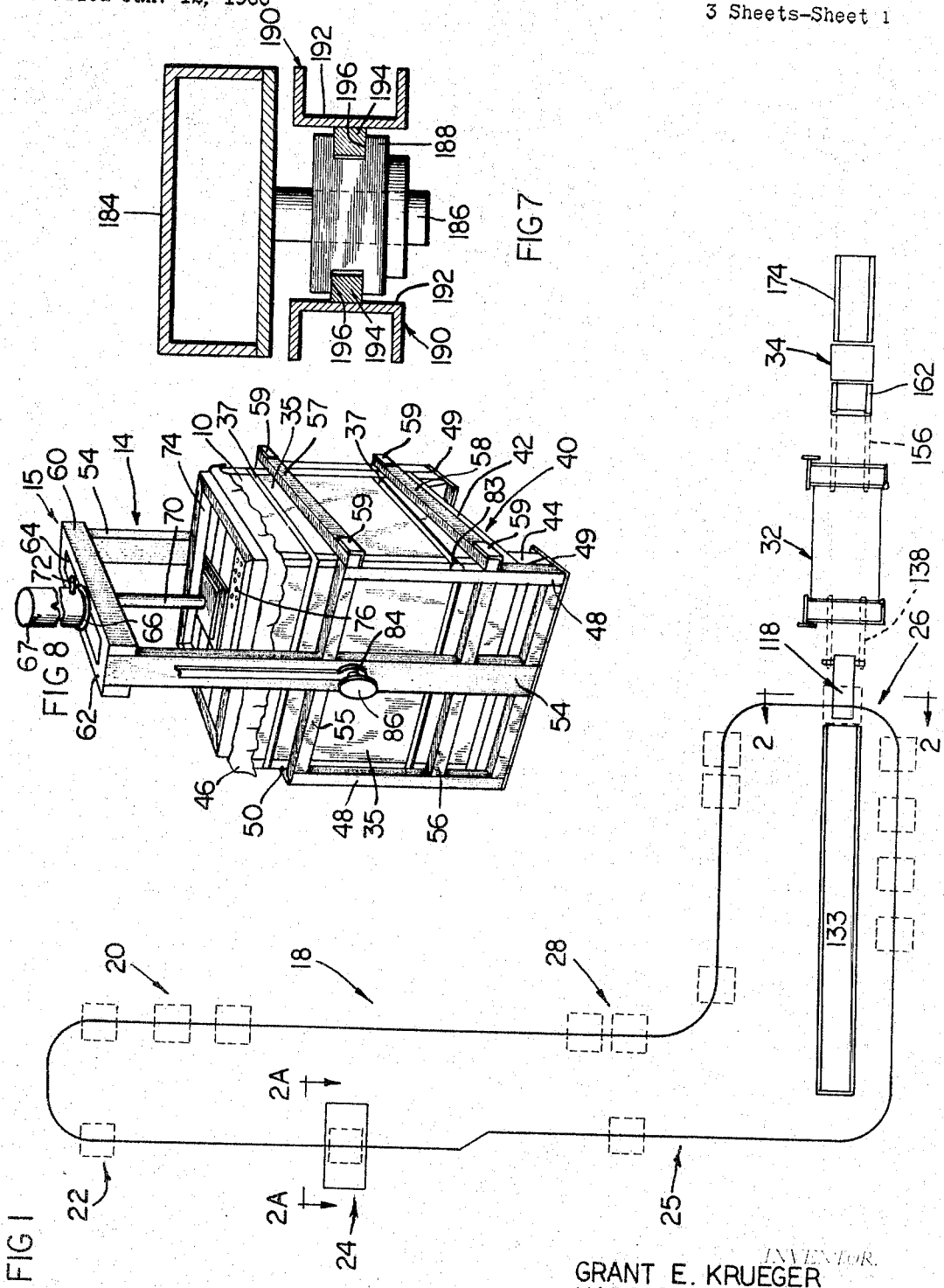
INVENTOR.
GRANT E. KRUEGER
HAROLD F. MOHR
O. CHARLES HUBER JR.
BY Anderson, Luedeka, Fitch, Even, & Tabin
ATTORNEYS Dec. 5, 1967     G. E. KRUEGER ET AL     3,355,805
CHEESE MANUFACTURING APPARATUS
Filed Jan. 12, 1966                                    3 Sheets-Sheet 2
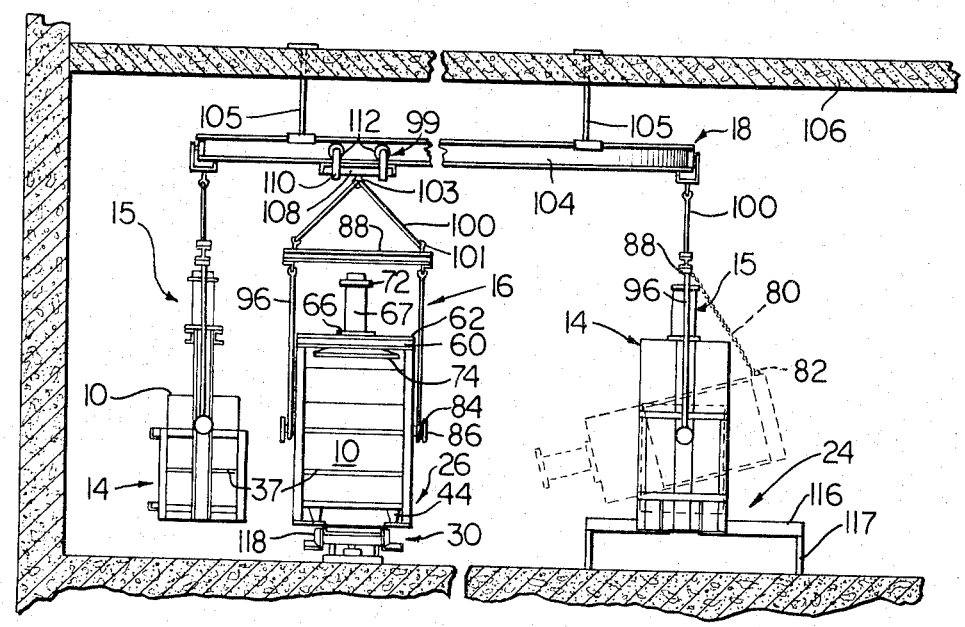
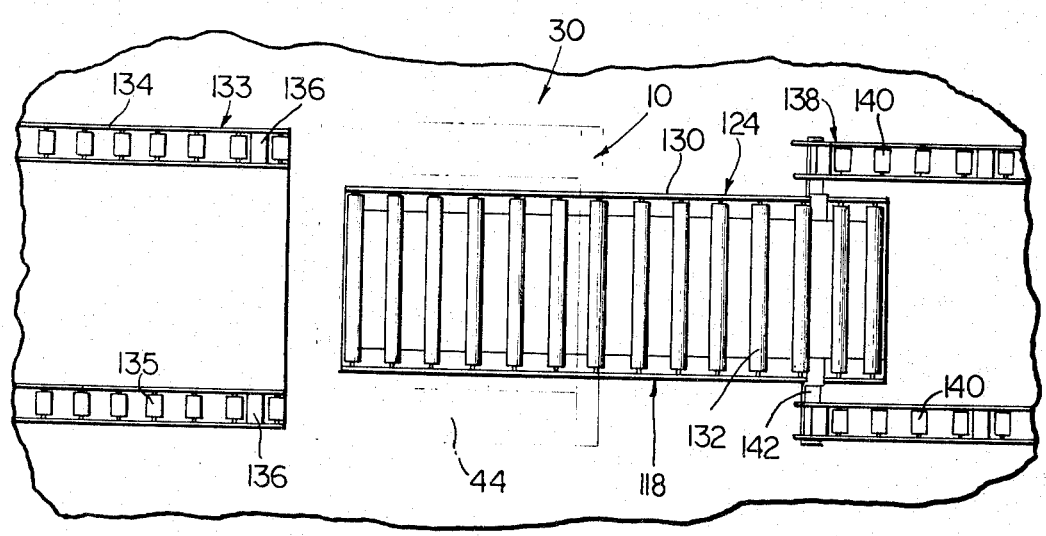
INVENTOR.
GRANT E. KRUEGER
HAROLD F. MOHR
O. CHARLES HUBER JR.
BY Anderson, Luedeka, Fitch, Even, & Tabin  ATTORNEYS

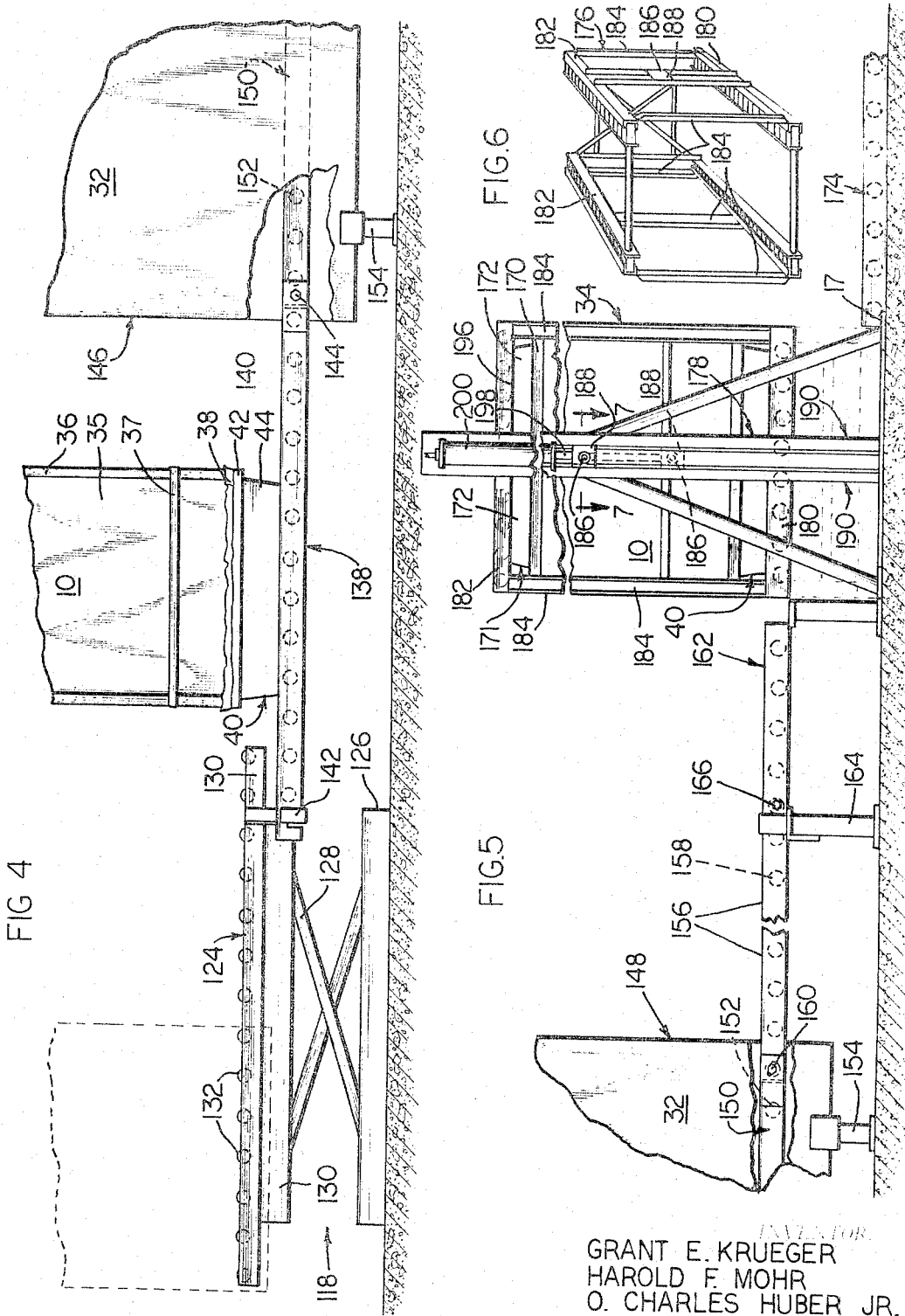

United States Patent Office 3,355,805
Patented Dec. 5, 1967

3,355,805
CHEESE MANUFACTURING APPARATUS
Grant E. Krueger and Harold F. Mohr, Green Bay, Wis., and Otto Charles Huber, Jr., Oak Park, Ill., assignors to National Dairy Products Corporation, Chicago, Ill., a corporation of Delaware
Filed Jan. 12, 1966, Ser. No. 520,177
9 Claims. (Cl. 31—46)

This invention relates generally to cheese manufacturing apparatus, and more particularly, to an improved apparatus useful in the production of large blocks of hard natural cheese such as Cheddar cheese.

Natural cheese, in general, is manufactured by coagulating or curdling milk of proper acidity with rennet, stirring and heating the curdled milk to separate the curd from the whey, draining off the whey and collecting and pressing the curd. The desired flavor, aroma and texture is then obtained for many cheeses by curing, that is, holding it for a specific time at a specific temperature and humidity. Often the curing process is preceded by placing the uncured cheese in a vacuum chamber for a specified time to remove undesired gas.

Traditionally, natural cheeses such as the hard cheese known as Cheddar have been produced in a variety of sizes of disks ranging from 10 to 80 pounds in weight, most of which were too large for convenient marketing to consumers. In modern cheese production, however, it has become desirable to produce large rectangular blocks of cheese which, for example, weigh as much as 700 pounds and have dimensions of 22 inches x 28 inches x 28 inches which can readily be divided and packaged as small consumer-size rectangular blocks, either before or after curing. In producing such large blocks of cheese, it has become the practice to drain most of the whey from the curd in the usual fashion and then to place the mixture of curd with some whey in a large rectangular container for pressing, the sides of which container become part of the box in which the blocks of cheese is ultimately formed and cured. The ends of the container are structures with openings through which the whey flows as it is pressed. Thus it is possible to mechanize and combine the step of pressing the curd with a secondary draining of the whey, with both steps being performed more or less continuously. After draining and pressing, the box is closed by non-porous end members for curing of the cheese.

When such a process is utilized it is desirable that the container be drained while it is tilted into a variety of orientations in order to facilitate drainage and so that the moisture content of the cheese will be uniform throughout the block. This has required the use of heavy handling machinery during the pressing and draining process and has resulted in cumbersome inefficient manipulations of the containers of mixed curd and whey.

Production of such large blocks of cheese also presents certain sanitation problems. The production of cheese, as of all foods, must be performed under strict hygienic conditions. In cheese making, moreover, the lactic acid developed is supplied by special starter cultures of bacteria which must convert all milk sugar left in the curd into lactic acid within a reasonable time. Several factors may prevent this action from taking place. Among these factors are the presence of bacteriophages and even of the chemicals used for the disinfection of utensils. Bacteriophages or "phages" are viruses which destroy sensitive bacterial cells by breaking into the cellular wall and produce new phage particles thereby slowing or preventing the production of lactic acid which is necessary in cheese making. Phage outbreaks are controlled by the maintenance of rigid hygienic standards. Naturally maintenance of such standards is difficult where the product is both bulky and heavy and requires the use of such large and complex handling machinery as has been described above. Such machinery not only is difficult to clean, but its very presence in a plant may make it more difficult to clean and sanitize a production area and thus is conducive to poor cleaning.

Accordingly, it is a primary object of the invention to provide improved apparatus for use in manufacturing large blocks of natural cheese which will not only aid in producing uniform moisture content throughout the block but will also facilitate the maintenance of hygienic conditions.

Another object of the invention is to provide improved and simplified apparatus for handling large containers of curd and whey during the draining and pressing stages of cheese production.

Still another object of the invention is to provide a novel cheese making apparatus, the use of which will contribute to maintaining suitable hygienic conditions.

A further object of the invention is to provide improved apparatus for preparing large cheese blocks for curing and for transporting containers of curd with some whey from the stirring vats to the curing areas while the curd is being pressed and drained.

Yet another object of the invention is to provide improved apparatus for use in pressing curd and draining whey from large containers of curd containing some whey and in preparing large blocks of cheese for curing.

Still another object of the invention is to provide improved apparatus which will facilitate the inversion and closing of large boxes of cheese prior to curing.

Other objects and advantages of the invention will become apparent from the following description when considered in conjunction with the accompanying drawings, in which:

FIGURE 1 is a diagrammatic plan view of apparatus showing various of the features of the invention;

FIGURES 2 and 2A are elevational views respectively looking along lines 2—2 and 2A—2A of FIGURE 1;

FIGURE 3 is a detailed plan view of a portion of the apparatus shown in FIGURE 1;

FIGURE 4 is a side elevational view of a portion of the apparatus shown in FIGURE 1;

FIGURE 5 is a side elevational view of another portion of the apparatus shown in FIGURE 1;

FIGURE 6 is a perspective view of the turnover frame;

FIGURE 7 is a fragmentary sectional view taken along line 7—7 of FIGURE 5; and

FIGURE 8 is a perspective view of a portion of the apparatus shown in FIGURES 1 and 2.

Generally, the improved apparatus as shown in the drawings utilizes a plurality of rectangular containers 10 adapted to receive a large quantity of curd and some whey for pressing and further draining prior to curing. Each container is adapted to be positioned in one of a plurality of pressing frames or holders 14 which supports the container and includes an air powered press 15 of the reciprocating type for applying force to the contents of the container. Each of the pressing frames is pivotally mounted in a suspension frame 16 so that the container it holds can be rotated about a horizontal axis into a plurality of orientations.

The suspension frame in turn is suspended from and movable along an overhead conveyor 18 comprising an endless closed loop. As illustrated, the overhead conveyor loop extends from a loading station 20, where the containers, filled with curd and containing some whey, are placed in the pressing frames, through successive pressing stations 22, 24 and 25, where the press 15 is connected to an air pressure source, and to an unloading station 26 where the containers are removed from the pressing frame. The overhead conveyor loop further extends from the unloading station 26 through a frame storage and cleaning area 28 and returns to the loading station 20.

At the unloading station 26 a second conveyor means 30 is provided for removing the containers from the pressing frames, moving the containers into and out of a vacuum chamber 32 where gas is extracted from the cheese and to a curing area (not shown). A turnover means 34 is also provided for inverting the containers after they are removed from the vacuum chamber 32 in order to facilitate closing the containers prior to curing.

An important feature of the improved apparatus is that it is almost entirely suspended from the ceiling or supported by simple means above the floor of the plant. By this expedient sanitizing of the plant area and prevention of infection of the bacterial starter culture by phage is greatly facilitated. Furthermore, the use of heavy complex machinery such as fork lift trucks to move the containers into and out of presses and to tilt and invert them is eliminated. In addition, more whey may be recovered and utilized for various by-products than is the case with prior apparatus.

Each rectangular container 10 in which the curd and the remaining whey are loaded in this instance is an open-ended box having four side panels 35 made of wood and joined to one another by angle irons 36 at their vertical adjacent edges and by two horizontally disposed conventional steel straps 37 girdling the container. One end of the box is covered by a sheet 38 of porous material such as cheese cloth and rests on a stainless steel pallet 40 with the cloth extending outside of the side panels. The pallet comprises a flat supporting plate 42 on which the four side panels are supported and two downwardly extending base members or runners 44. The supporting plate is perforated for the flow of whey from the box. The runners 44 are straight parallel members extending along opposite sides of the supporting plate. Another sheet 46 of porous material such as cheese cloth covers the top of the container 10.

As best shown in FIGURES 2 and 8 each pressing frame 14 in which the containers 10 and their supporting pallets 40 are placed is a rectangular stainless steel framework having four corner posts 48 formed in this instance as hollow tubes of rectangular cross-section. Base plates 49 are attached to the lower ends of the corner posts 48 along opposite sides of the pressing frame 14 and form the bottom of the frame which receives the pallet runners 44, the corner posts being short enough that their upper ends are below the tops of the side panels 35 of a container 10 in the frame. Two of the corner posts 48 on opposite sides of the pressing frame 14 are joined by two horizontal beams 50 which form the rear of the pressing frame 14. The upper beam 50 is attached to the corner posts at their upper ends and the lower beam 50 is attached to the posts at points spaced above their lower ends so as to contact the adjacent side panel 35 of the container above the pallet. Bracing rods (not shown) join the lower beam 50 and the base plates 49 and further aid in supporting a container placed in the frame.

On each side of the pressing frame 14 is a vertically extending side post 54 which spans and is secured to side beams 55 and 56 at the same levels as the rear beams 50. The side posts, side beams, and rear beams contact the sides of the box to retain the same in the frame.

It is apparent that the various posts and beams form a rectangular parallelepiped having an open front for movement of containers 10 into and out of the frame. This open front is closed by two horizontal removable rails 57 and 58 which are retained at the same heights as the side and rear beams in brackets 59 in the form of U shaped angle plates on the adjacent corner posts. The side posts 54 extend vertically above the beams and are securely joined at their upper ends by a horizontal cross bar 60. The cross bar is provided with a generally flat upper face 62 and a vertically extending aperture 64 which as illustrated is elongated and also extends longitudinally across the cross bar.

Attached to and supported by the cross bar is the press 15. The press includes a cylinder plate 66 which is mounted on the upper face 62 of the cross bar and has secured thereupon a cylinder housing 67 with a piston whose rod 70 extends downwardly through the aperture 64 of the cross bar. The piston is actuated by air pressure and for this purpose coupling means 72 are provided on the cylinder housing for selectively connecting the cylinder housing 67 to sources of air pressure (not shown). The lower end of the piston rod 70 is attached to a horizontal pressure plate 74 in the form of a rectangular steel plate suitably dimensioned to fit within the rectangular container 10 over the top cheese cloth 46 and having apertures 76 extending vertically therethrough for the passage of liquid whey. Suitable valves and couplings (not shown) are provided so that the plate may be selectively raised and lowered by the applications of air pressure to the coupling means 72. The length of stroke of the piston is such that the pressure plate may be raised above the top of the side panel when air is admitted to the lower end of the cylinder and exhausted from the top.

As previously noted, in operation of the apparatus, the frame 10 is tilted into various orientations. The frame is maintained in these positions by a stabilizing chain 80 attached at one end to the suspension frame 16 and having a hook 82 on its other ends. This hook engages the frame by means of a U-shaped bolt 83 which is attached at its ends to one side of the frame adjacent the lower rail 58 and which has its opening projecting beyond the outer face of the rail 58. This arrangement provides an eye which the hook 82 on the stabilizing chain 80 can engage.

As previously mentioned the pressing frame 14 is pivotally mounted in the suspension frame 16 and for this purpose, horizontally aligned trunnions 84 are provided on the side posts 54 and extend outwardly from the pressing frame between the upper and lower side beams 55 and 56, and slightly above the center of the gravity of the pressing frame 14 with a filled container 10 positioned therein. The trunnions 84 are provided with disks or keepers 86 on their outer ends in order to maintain the desired horizontal alignment of the pressing frame 14 in the suspension frame 16.

The suspension frame includes a horizontal carrier beam 88 which, as illustrated, is an I-beam approximately as long as the distance between the keepers 86 of the pressing frame. Hanger arms 96 are pivotally suspended from opposite ends of the carrier beam and, at their lower ends rotatably receive the trunnions 84. The hanger arms 96 and carrier beam 88 thus pivotally support the pressing frame 14 so that it can rotate about a horizontal axis which is defined by the trunnions 84 and is parallel to the carrier beam. The hanger arms 96 are long enough in relation to the pressing frame 14 so that the top of the cylinder housing does not touch the carrier beam 88 as it rotates about the axis defined by the trunnions 84.

Since the trunnions are positioned close to the center of gravity of the pressing frame 14 and filled container 10, it is relatively easy for a single workman to manually tilt the frame as is required in the operation of the apparatus which will be described below. The stabilizing chain 80 is attached at one end to the carrier beam 88 and is of such length that, when the hook 82 on the end of the chain engages the U-bolt 83, the pressing frame 14 will be retained in an inverted position with its lower end higher than the cylinder. In this instance, the angle of tilt with respect to the horizontal is small. For different angles, different lengths of chain are used.

The carrier beam 88 and hence the entire assembly of the pressing frame 14 and suspension frame 16 is suspended from an elongated trolley 99 forming part of the overhead conveyor 18. This is accomplished by means of two tension members 100 attached at their lower ends to the ends of the beam 88 through upwardly projecting eye bolts 101 on the upper face of the beam. At their upper ends, the tension members 100 of the suspension frame are attached to the trolley 99 by means of an eye bolt 103 which extends downwardly from the middle of the trolley so that the carrier beam 88 and the axis of rotation of the pressing frame 14 each extend longitudinally of the trolley and the conveyor. Preferably, as shown in the drawings, the front or open side of the frame is on the outside of the loop of the conveyor 18.

As illustrated, the overhead conveyor 18 comprises a plurality of trolleys for the respective pressing frames 14 and a single I beam monorail track 104 suspended by suitable supporting means 105 from a ceiling 106. The illustrated conveyor is "free" or unpowered with the pressing frames being manually movable between the various stations, although, of course, it would be possible to provide a powered conveyor of any conventional type. The illustrated conveyor trolley 99 is a conventional four wheeled monorail trolley suspended by U-shaped hangers 110 attached to the axles of wheels 112 two of which are positioned on each side of the web of the I beam.

The utility of the present invention may most easily be understood in conjunction with a description of a specific series of processing steps utilizing the container and apparatus previously described for making hard natural Cheddar cheese. It will be understood that the steps could be changed in a variety of ways while still utilizing the apparatus of the present invention.

As previously mentioned, the illustrated conveyor 18 extends from a loading station 20 through successive pressing stations 22, 24 and 25 to an unloading station 26, and through a frame storage and cleaning area 28 back to the loading station 20. The containers 10 in this instance are filled after the primary draining has taken place with a mixture of curd and the remaining whey from vats (not shown), before being placed in the pressing frames. The conveyor loop, however, may extend from the loading station to the area of the vats so that the containers are loaded after they have been placed in the frames.

The conveyor loop, as illustrated, has the general shape of two L's with their legs parallel to one another and interconnected by cross rails. The loading station 20, as shown in the drawings, is located at the end of the longer leg of the small L and the three pressing stations are located on the parallel longer leg of the other L. The loading of the filled containers in the frames could be accomplished by fork lift trucks or by means of wheeled pallets placed on an elevated loading platform or a conventional hinged elevator section of the monorail could be provided so that the frames could be lowered to floor level for loading and then raised and placed on the monorail track.

In any event, after loading the pressing frames 14 with the filled containers 10 are moved via the adjacent cross rail to the adjacent leg of the other L and to the first pressing station 22. There, a plurality of air hoses (not shown), are connected to a source of air pressure and are adapted to be connected to the cylinder housings 67 on the pressing frames 14 via the coupling means 72. Desirably, each pressing frame 14 is tilted slightly, on the order of a few degrees from the vertical, to facilitate the drainage of whey from the container 10 and the frame 14 through the perforations 44 in the supporting plate 42 of the pallet 40. The frame is maintained in this position by inserting the hook 82 of one of the stabilizing chains 80 having a suitable length through the U-bolt 83. In a specific example, where the container has a height of 4 ft. and sides of 3 ft. in length a force of 1,000 pounds is applied to the pressure plate 74 for ½ hour.

After pressing and draining at the first pressing station 22, each pressing cylinder 67 is disconnected from the air pressure source and each pressing frame is moved further along the longer leg of the longer L of the overhead conveyor 18 to the second pressing station 24 where it is positioned directly over one of a plurality of drain pans 116. The drain pans are provided with legs 117 to space them from the floor so as to facilitate cleaning and disinfecting the area adjacent the drain pans. Each pressing frame 14 is then tilted more than 90° from the vertical as best shown in FIGURE 2 in dashed lines so that the whey will drain through the apertures 76 in the pressure plate 74 at the top of each container rather than through the perforations in the pallet 40. The pressing frame 14 is maintained in this position by hooking a stabilizing chain having a suitable length through the U-bolt 83. A plurality of air hoses connected to a source of air pressure also are provided at the second pressing station and are coupled to the presses 15 through the coupling means 72. In a specific example, utilizing the 22 inches x 28 inches x 28 inches containers previously mentioned, approximately 2,000 pounds force is applied for approximately ten minutes at this station although a greater force might be applied if desired. Whey runs out the top of the container 10 and is caught by the drain pans 116 from whence it may be removed for further utilization.

After pressing at the second pressing station 24 the air hose is disconnected and the stabilizing chain 80 is unhooked from the U-bolt 83. The pressing frame 14 is returned to a generally upright position and is moved along the monorail 104 to the third pressing station 25, which, as shown, is on the same leg of the conveyor loop as the first and second pressing stations. Other air hoses are provided at the third pressing station and are connected to the presses 15 at that station. Each pressing frame is tilted slightly at the third station in the same manner as it is at the first pressing station to facilitate drainage of whey. At the third station, in a specific example, utilizing the containers previously described, a force of approximately 2,000 pounds is applied for approximately three hours and fifteen minutes.

After this final pressing, the hoses are disconnected from the presses 15 and the stabilizing chain 80 is unhooked from the U-bolt 83 returning the frame 14 to an upright position. The pressing frame then is moved along the track 104 to the unloading station 26, which as illustrated is on one of the two cross rails joining the two L's of the overhead conveyor 18.

The containers 10 are removed from the pressing frames 14 at the unloading station 26 in a manner to be described below in detail. The empty frames are then moved onto the adjacent leg of the conveyor 18 where facilities are provided for them to be cleaned and stored in the storage and cleaning area 28 prior to being returned to the loading station 20.

The unloading station 26 may be seen most clearly in FIGURES 2, 3 and 4. The second conveyor means 30 which functions to remove the containers from the frames at the unloading station normally is positioned below the suspended pressing frames 14 and extends transversely to the track 104. As previously noted, the axes of rotation of the frames 14 are parallel to the overhead conveyor track 104 so that the base members or runners 44 of each pallet, extend transversely to the track and each frame is so positioned on the track that its front, through which the container is removed, is outside the conveyor loop. The second conveyor means includes a take-off device 118, which is positioned below the frames and extends into the area outside of the conveyor loop. The take-off device 118 has a roller conveyor section 124 which is narrower than the space between the runners 44 of the pallet and the parts of the frames supporting the runners. The take-off conveyor section is moved upwardly between these parts and into contact with the supporting plate 42 so as to support the pallet while it is moved out of the frame 14 through its front and outside of the conveyor loop area.

More specifically, the take-off device 118 includes a base 126, and a scissors type elevator mechanism 128 for raising and lowering the conveyor section 124 which is powered by conventional hydraulic means (not shown). The conveyor section 124 includes an elongated rectangular conveyor frame 130 the longitudinal dimension of which extends transversely of the monorail track 104 and rollers 132 extending transversely thereacross. A portion of the conveyor frame 130 is positioned directly below the monorail track 104 and a pressing frame 14 suspended from the track and another portion extends outside the area defined by the conveyor loop so that a container may be moved out of the path of the frames on the track.

Adjacent one end of the take-off device 118 and on the inside of the area defined by the overhead conveyor loop, is a storage conveyor 133. The storage conveyor comprises an elongated framework 134 extending away from the take-off device 118 and in line therewith and provided with two parallel spaced apart rows of rollers 135. These rows have the same spacing as the runners 44 of the pallet 40 so as to receive the runners.

The framework 134 of the storage conveyor 133 is supported above the floor by legs (not shown) to facilitate sanitation of the area. The legs are desirably of such height that the rollers 135 will contact the runners of a pallet which is being supported by its supporting plate 42 by the rollers 132 of the take-off device 118 while it is being removed from the pressing frame 14. Thus a container 10 may be removed from a frame 14 onto the rollers 132 of the take-off device 118 and then rolled smoothly onto the rollers 135 of the storage conveyor 133 after the frame has been moved away on the conveyor.

Adjacent the opposite end of the take-off device 118 from the storage conveyor 133 is a first portable conveyor 138 which is also a roller conveyor section similar to the storage conveyor, in that it has two parallel rows of rollers 140 which have the same transverse spacing as the rollers 135. The first portable conveyor 138 in operation extends from approximately the end of the take-off device 118 into the vacuum chamber 32 and is movable to facilitate cleaning of the area and removal from the vacuum chamber. It is supported above the plant floor by suitable support means within the vacuum chamber and at the end of the take-off device. As illustrated, hangers 142 are provided on each side of the end of the take-off device frame 130. The upper portion of each hanger engages and is supported by the frame 130 of the take-off device 118 while the lower portions engage and support one end of the first portable conveyor 138. The hangers are so dimensioned that the rollers 140 are at a suitable distance to contact the pallet runners 44 when the pallet plate 42 is resting on the rollers 133. The other end of the portable conveyor is supported by removable support bolts 144 which engage the structure of the vacuum chamber 32.

In operation of this portion of the apparatus, a pressing frame 14 having mounted within it a container 10 filled with curd is moved along the monorail from the third pressing station 25 to the unloading station 26 and positioned directly above the take-off device 118. The pressure plate 74 is retracted to its upper position above the tops of the side panels 35. The conveyor section 124 is raised by operation of the hydraulic elevator means so that it moves upward between the base members 44 of the pallet 40 and into contact with the supporting plate 42 of the pallet so that the rollers 132 support the pallet. The rails 57 and 58 are then removed from the pressing frame 14 and the container 10 is moved out of the pressing frame on the rollers 132. The pressing frame 14 is then removed from the unloading station 26 along the monorail track 104 to the frame cleaning and storage area 28 as previously noted.

The container may then be moved in one direction onto the rollers 135 of the storage conveyor 133 or, if desired, may be moved directly onto the rollers 140 of the first portable conveyor 138, and into the vacuum chamber 32. In addition, containers on the storage conveyor 133 may easily be rolled across the conveyor section 124 of the take-off device 118 and onto the first portable conveyor 138 when the said conveyor section 124 is positioned at the proper height so that contact with the various sets of rollers by the pallet is continuous.

As previously mentioned, the purpose of placing the containers in the vacuum chamber is to remove gas from the cheese in order to achieve the desired texture. In a specific example where blocks of Cheddar cheese weighing approximately 700 pounds are produced the containers are placed in the vacuum chamber for 35 minutes. The chamber 32 may be of any conventional design but as shown has an entrance end 146 and exit end 148 in line with the first portable conveyor. A chamber conveyor 150 is provided within the vacuum chamber to facilitate movement of the containers. As shown, the chamber conveyor is similar in form to the first portable conveyor 138 in that it has two rows of rollers 152 which are positioned at a height and spacing so as to contact the runners 44 of the pallet when it is moved onto the chamber conveyor 150 from the first portable conveyor 138. Desirably, the entire vacuum chamber 32 is supported above the floor by legs 154 which facilitates sanitation of the plant area.

A second portable conveyor 156 is provided at the exit end 148 of the chamber 32 which is similar in form to the first portable conveyor with two rows of rollers 158 spaced so as to contact the base members 44 of the pallet. The second portable conveyor is attached to the structure of the vacuum chamber by removable bolts 160 and extends therefrom to a closing platform 162. The closing platform, on which the container rests while its upper end is closed may also be in the form of an elevated roller conveyor supported above the plant floor by legs 164. The second portable conveyor may be attached to the closing platform by the illustrated support bolts 166. In a specific example, the closing is accomplished by fastening a wooden end panel to the side panels 35 which is held against the ends of the side panels by angle bars 170 of another pallet 171 with supporting legs 172.

At this point in the process the container is inverted so that the pallet 40 may be removed and the other end of the container closed. In addition, it is desired to lower the box to the floor for transfer to the curing area by suitable means such as a lower roller conveyor 174. These functions are performed by the turnover means 34 to be next described.

The turnover means 34 is at the opposite end of the closing platform 162 from the second portable conveyor 156 and its best shown in FIGURES 5, 6 and 7. In general, it comprises a rectangular frame 176 open on one side to receive and discharge boxes 10 with pallets 40 and 171 on opposite ends and mounted on a supporting framework 178. The mounting of the frame 176 in the framework 178 is such that the frame is adapted for rotary movement about a horizontal axis extending through the center of the frame 176 and for vertical movement between an upper position shown in full lines in FIGURE 5 and a lower position shown in broken lines in FIGURE 5. In the upper position a first side 180 of the frame adjacent the open side is disposed horizontally in alignment with the closing platform. In the lower position in which the opposite side 182 of the frame parallel to the first side is disposed horizontally and in alignment with the lower roller conveyor 174.

Each of the parallel sides 180 and 182 of the turnover frame 176 preferably is a roller conveyor section to receive the runners 44 and legs 172 of the pallets 40 and 171 on opposite sides of each box and facilitate movement of the same into and out of the frame. Suitable connecting mmebers 184 extend between the two sections and secure them together in parallel relation to complete the frame.

To mount the turnover frame on the supporting framework 178, the two connecting members in the center of each side of the frame 176 carry aligned stub shafts 186 which project horizontally and outwardly away from each other and from opposite sides of the frame and are journaled in bearing blocks or slides 188. These blocks in turn are slidably guided for vertical reciprocating movement along parallel vertical columns 190 of the supporting framework of the turnover mechanism. As illustrated herein, each column is formed by spaced parallel channels 192 having vertical ribs 194 secured to their adjacent sides and fitting into guide grooves 196 on opposite sides of the bearing block 188.

The axis of the stub shafts 186 is the horizontal axis of turning of the turnover frame 176. To raise and lower the frame, the bearing blocks are connected to the lower ends of the rods 198 of fluid pressure actuators of the piston and cylinder type. In this instance, the actuators are hydraulic with their cylinders 200 secured in vertical positions to the upper ends of the columns 190. Suitable hydraulic circuits (not shown) with appropriate connections to the cylinders are provided for selectively raising and lowering the bearing blocks 188 in unison and therewith the turnover frame 176.

In operation of the turnover means 34, the turnover frame is raised to the upper position with the side 180 in the same horizontal plane as the closing platform 162 and the frame open toward the closing platform. The container 10 is then rolled onto the side 180 and the frame is rotated 180° about the axis defined by the stub shafts 186 so that the frame opens toward the lower roller conveyor 174. This rotation is clockwise as viewed in FIGURE 5, so that the closed side of the framework supports the container during the rotation. After or during rotation, the bearing blocks 188 are lowered in their guides by actuation of the cylinders 200 so that the side 182 is lowered to the same height as the conveyor 174. The container may then be rolled out of the turnover frame 176 onto the conveyor 174, the pallet 44 removed and a sixth wooden panel affixed to the side panels 35 to close the cheese box. The turnover frame 176 is then rotated 180° to its original orientation and raised to its original height by operation of the cylinder 200 on the slides 188 so that it can receive another container for inversion. The closed cheese box is then rolled on the lower conveyor 174 to the curing area.

Various changes and modifications may be made in the above described apparatus without departing from the spirit and scope of the invention, various features of which are set forth in the accompanying claims.

What is claimed is:

1. Apparatus for use in the manufacture of cheese comprising, a holder adapted to receive and support an elongated open ended container of a mixture of curd and whey, said container having means closing one end while permitting the flow of whey through the end, reciprocating type pressing means attached to said holder and engageable with said mixture at the other end of the container for applying force to the mixture to separate whey from the curd, said pressing means permitting the flow of whey through said other end of said container, suspension means for supporting said holder and pressing means in an elevated position, pivot means connecting said holder and said suspension means for rotation of the holder and said container to different orientations in which whey drains from the different ends of the container, and conveyor means connected to said suspension means for moving said holder through successive pressing and removal stations where said pressing means is actuated to apply said force while the container is in said different positions and where the container is removed from said holder after the pressing.

2. Apparatus in accordance with claim 1 wherein said holder comprises a rectangular framework open on one side and having closure members closing such side to retain a container therein while being removable for movement of a container into and out of the framework.

3. The apparatus of claim 2 in which said pivot means comprises aligned trunnions projecting horizontally in opposite directions from opposite sides of said framework and journaled in said suspension means for rotation of said container about a horizontal axis.

4. Apparatus in accordance with claim 1 wherein said pressing means comprises a fluid pressure actuator adapted to be connected to a source of fluid pressure at at least one of said stations along said conveyor means, and a pressure plate connected to said actuator and movable thereby into and out of said other end of said container.

5. Apparatus in accordance with claim 1 wherein said conveyor means comprises an overhead rail conveyor in the form of an endless loop with a trolley to which said suspension means is attached.

6. The apparatus of claim 1 in combination with means for receiving a container from said holder at said removal station and supporting the same at an upper level and means for inverting the container and lowering it to another level after it is removed from said holder.

7. Apparatus for use in the manufacture of cheese comprising a holder for supporting a continer for a mixture of curd and whey, reciprocating type pressing means attached to said holder for applying force to said mixture to separate the whey from the curd, suspension means supporting said holder in an elevated position and rotatably connected thereto for pivotal movement of the holder and the container to a plurality of different orientations in which the whey is drained from the container, and conveyor means connected to said suspension means for moving such means and said holder to a plurality of locations.

8. The apparatus of claim 7 in which said conveyor means is an overhead rail conveyor and a trolley movable along the conveyor and supporting said suspension means.

9. Apparatus for use in the manufacture of cheese comprising a holder for supporting a container for a mixture of curd and whey, pressing means attached to said holder for applying force to said mixture to separate the whey from the curd, suspension means supporting said holder in an elevated position and rotatably connected thereto for movement of the holder and the container to a plurality of different orientations in which the whey is drained from the container, means for receiving the container from said holder at said removal station and supporting the container at an upper level, and means for inverting the container and lowering it to another level after it is removed from said holder, and conveyor means connected to said suspension means for moving such means and said holder to a plurality of locations.

References Cited
UNITED STATES PATENTS

| | | | |
|---|---|---|---|
| 1,232,251 | 6/1917 | Dziewiatkowski | 100—125 |
| 2,567,957 | 9/1951 | Miollis | 31—49 |
| 2,851,776 | 9/1958 | Czulak et al. | 31—44 X |
| 2,908,973 | 10/1959 | Berge | 31—46 |
| 3,133,492 | 5/1964 | Czulak et al. | 100—110 |

ALDRICH F. MEDBERY, *Primary Examiner.*

UNITED STATES PATENT OFFICE
CERTIFICATE OF CORRECTION

Patent No. 3,355,805                                December 5, 1967

Grant E. Krueger et al.

It is hereby certified that error appears in the above numbered patent requiring correction and that the said Letters Patent should read as corrected below.

Column 1, line 27, for "were" read -- are --; line 32, before "which" insert -- and --; line 39, for "blocks" read -- block --; line 52, for "Thin" read -- This --; column 4, line 28, for "ends" read -- end --; column 5, line 72, for "pressiing" read -- pressing --; column 8, line 25, for "which facilitates" read -- so as to facilitate --; line 51, for "it best" read -- is best --; line 64, strike out "in which"; line 72, for "mmebers" read -- members --; column 10, line 30, for "continer" read -- container --.

Signed and sealed this 11th day of February 1969.

(SEAL)
Attest:

Edward M. Fletcher, Jr.                            EDWARD J. BRENNER
Attesting Officer                                       Commissioner of Patents

Dedication 3,355,805.—*Grant E. Krueger* and *Harold F. Mohr*, Green Bay, Wis., and *Otto Charles Huber, Jr.*, Oak Park, Ill. CHEESE MANUFACTURING APPARATUS. Patent dated Dec. 5, 1967. Dedication filed Dec. 8, 1969, by the assignee, *National Dairy Products Corporation*.

Hereby dedicates to the Public the remaining term of the said patent.

[*Official Gazette March 31, 1970.*]